(12) United States Patent
Slama

(10) Patent No.: US 10,859,818 B2
(45) Date of Patent: Dec. 8, 2020

(54) CLEANING SYSTEM FOR A CAMERA LENS

(71) Applicant: SMR Patents S.àr.l., Luxembourg (LU)

(72) Inventor: Alexander Slama, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 105 days.

(21) Appl. No.: 16/098,742

(22) PCT Filed: Apr. 27, 2017

(86) PCT No.: PCT/EP2017/060104
§ 371 (c)(1),
(2) Date: Nov. 2, 2018

(87) PCT Pub. No.: WO2017/191033
PCT Pub. Date: Nov. 9, 2017

(65) Prior Publication Data
US 2019/0146213 A1    May 16, 2019

(30) Foreign Application Priority Data

May 3, 2016    (DE) .......................... 10 2016 108 247

(51) Int. Cl.
*G02B 27/00* (2006.01)
*B60S 1/56* (2006.01)
(Continued)

(52) U.S. Cl.
CPC .......... *G02B 27/0006* (2013.01); *B60S 1/566* (2013.01); *B60S 1/583* (2013.01); *B60S 1/586* (2013.01); *H04N 5/2252* (2013.01)

(58) Field of Classification Search
CPC ...... G02B 27/0006; B60S 1/583; B60S 1/586; B60S 1/566; H04N 5/2252
(Continued)

(56) References Cited

U.S. PATENT DOCUMENTS 6,322,258 B1    11/2001 Ryan et al.
7,627,235 B2    12/2009 McCutchen et al.
(Continued)

FOREIGN PATENT DOCUMENTS

JP          5896440 B1      3/1916
JP          H09212758 A     8/1997
(Continued)

OTHER PUBLICATIONS

International Search Report dated Jul. 17, 2017 of International application No. PCT/EP2017/060104.
(Continued)

*Primary Examiner* — Jade R Chwasz
(74) *Attorney, Agent, or Firm* — Jones Day

(57) ABSTRACT

A camera lens includes a cover adapted to at least partially enclose at least one camera having at least one camera lens, drive means adapted to rotationally move the cover relative to the camera, and a housing adapted to hold the cover and the drive means, where the housing at least partially encloses the cover and includes at least one opening for allowing electromagnetic radiation to pass through the cover to the lens. A rear view display for a vehicle includes such a cleaning system, and a vehicle includes such a rear view display.

23 Claims, 4 Drawing Sheets

(51) Int. Cl.
*B60S 1/58* (2006.01)
*H04N 5/225* (2006.01)

(58) Field of Classification Search
USPC .......................................................... 359/511
See application file for complete search history.

(56) References Cited

U.S. PATENT DOCUMENTS

| | | | |
|---|---|---|---|
| 8,234,740 B2 * | 8/2012 | Kereth ..................... | B08B 1/00 |
| | | | 15/97.1 |
| 9,380,190 B2 | 6/2016 | Pawlowski | |
| 2014/0036132 A1 * | 2/2014 | Pawlowski ............ | G03B 17/02 |
| | | | 348/335 |
| 2016/0244028 A1 * | 8/2016 | Wakatsuki ......... | G02B 27/0006 |
| 2017/0349147 A1 | 12/2017 | Blank | |

FOREIGN PATENT DOCUMENTS

| | | |
|---|---|---|
| WO | WO 2017/191033 A1 | 11/1917 |
| WO | WO 2008/087648 A2 | 7/2008 |

OTHER PUBLICATIONS

Written Opinion dated Jul. 17, 2017 of International application No. PCT/EP2017/060104.

* cited by examiner

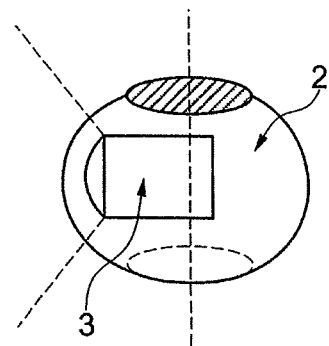
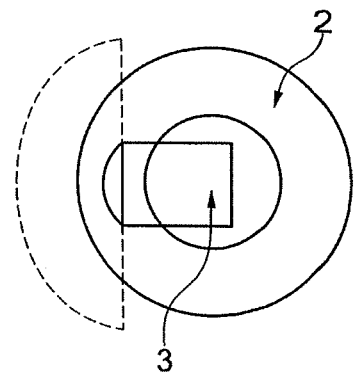
Fig. 2a      Fig. 2b
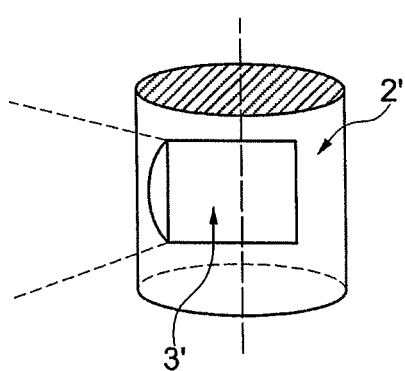
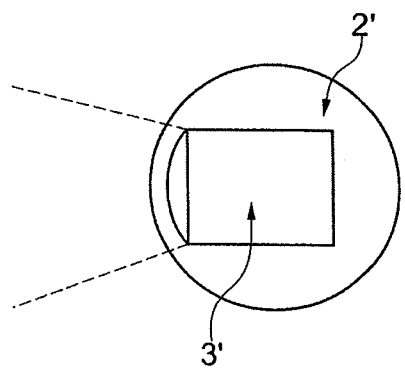
Fig. 3a      Fig. 3b
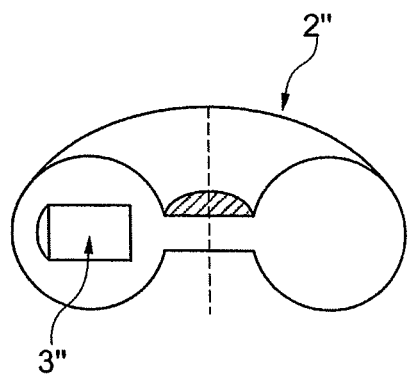
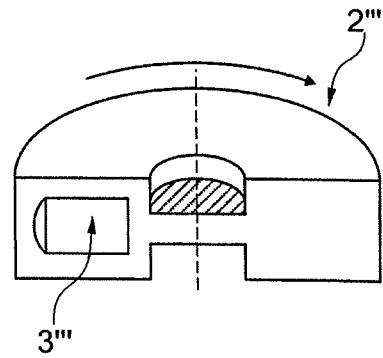
Fig. 4      Fig. 5

CLEANING SYSTEM FOR A CAMERA LENS

CROSS-REFERENCE TO RELATED APPLICATION

This application is a National Stage Entry of International Patent Application No. PCT/EP2017/060104, filed Apr. 27, 2017, which claims the benefit of priority to German Patent Application No. DE 10 2016 108 247.3, filed May 3, 2016, each of which is incorporated by reference herein in its entirety for all purposes.

FIELD OF THE INVENTION

The following description relates to a cleaning system for a camera lens which includes a cover adapted to at least partially enclose at least one camera having at least one camera lens. The following description also relates to a rear view display device for a vehicle including at least one positioning system, and to a vehicle including such a rear view display device.

BACKGROUND OF THE INVENTION

In modern day vehicles conventional mirrors are often replaced with camera based systems. It has been recognized that the vehicle mirrors currently used have several disadvantages. Conventional mirrors often offer the driver a very limited perspective on the environment of the vehicle. So-called "blind spots" can only be compensated through additional mirrors. Also, vehicle mirrors have a negative impact on the design and the aerodynamic characteristics of the vehicle. Therefore, vehicles often employ vision systems where the images of cameras on the left-hand side, right-hand side, the front and the back of the vehicle are presented to the driver, instead of employing conventional mirrors. For example, DE 10 2012 015 950 B3 describes a system where multiple cameras are arranged on a vehicle for capturing images of the vehicle's surroundings. For cleaning the camera lenses, DE 10 2012 015 950 B3 described employing cleaning elements that are led by mechanical means over respective cover glasses that cover the camera lenses. However, the disadvantage of this solution is that the view of the camera is temporarily blocked by the cleaning element. In other conventional examples, the camera needs to be physically moved for cleaning.

In WO 2005/096091 A1, another conventional solution is presented. A camera is located in a dome shaped cover which can be spun rapidly to dispel any extraneous matter from the lens cover. However, the solution described in WO 2005/096091 A1 requires a lot of installation space, is rather complex, and does not work with ingrained dirt.

Also, all solutions that are known do not provide a universal solution for cleaning the cameras of a system that employs multiple cameras, such as, for example, a narrow angle and a "fish eye" camera.

SUMMARY OF THE INVENTION

In one aspect, a camera lens includes a cover adapted to at least partially enclose at least one camera having at least one camera lens, drive means adapted to rotationally move the cover relative to the camera, and a housing adapted to hold the cover and the drive means, where the housing at least partially encloses the cover and includes at least one opening for allowing electromagnetic radiation to pass through the cover to the lens.

The cover may include essentially transparent and/or essentially scratch-proof material, preferably the cover includes Gorilla-Glas™.

The cover may fully enclose the camera, or the cover may enclose at least the lens of the camera.

The cover may include a geometry that is essentially rotational symmetric.

The cover may include a rectangular, cylindrical, spherical, conical, elliptical, and/or circular shape, preferably at least part of the cover includes a convex shape, or a concave shape, preferably at least that part of the cover includes a convex shape, or a concave shape that is adapted to be moved over the camera, and/or the camera lens.

The drive means may include a motor, preferably an electric motor, and/or a turbine, preferably a windmill, to rotationally move the cover relative to the camera by means of an air stream.

The cleaning system may include at least one cleaning device, where the cleaning device is adapted to clean an outer surface of the cover, and preferably the cleaning device is installed essentially perpendicularly to the cover and includes a curvature that follows the curvature of the cover, or extends essentially along a straight line.

The term "outer surface of the cover" can be used to refer to the surface of the cover that is exposed to the outside of the cover, which is located opposite the inner surface where the camera is located.

The cleaning device may include at least one brush for cleaning the outer surface of the cover where preferably the brush is kept rotationally relative to the cover.

The cleaning device may include at least one lip for cleaning the outer surface of the cover where preferably the lip includes PVC material.

The cleaning system may include at least one nozzle, where the nozzle is adapted to spray a cleaning fluid, preferably water, onto the outer surface of the cover, and preferably the nozzle is adapted to spray the cleaning fluid between the outer surface of the cover and the cleaning device.

The cleaning system may include at least one fan for circulating air around the cover.

The cleaning system may include at least one heating means in thermal contact with the cover where preferably the heating means includes at least one heating coil.

The cover may be adapted to at least partially enclose at least one auxiliary camera having at least one auxiliary camera lens.

The cleaning system may further include at least one auxiliary cover to at least partially enclose at least one auxiliary camera having at least one auxiliary camera lens, auxiliary drive means adapted to rotationally move the auxiliary cover relative to the auxiliary camera, where the housing is adapted to hold the auxiliary cover and the auxiliary drive means, the housing includes an auxiliary opening for allowing light to pass through the auxiliary cover to the lens of the auxiliary camera, and, preferably, the auxiliary cover is adapted to at least partially enclose a camera having a wide aperture for surround view and the auxiliary cover is adapted to at least partially enclose an auxiliary camera having a narrow aperture for mirror replacement.

In another aspect, a rear view display device for a vehicle, preferably for a motor vehicle, includes at least one cleaning system.

In yet another aspect, a vehicle includes at least one rear view display device.

In various aspects according to example advantages, the cleaning system provides a universal solution for any field of view camera and is applicable for one or more cameras in one single cover. Due to the rotational movement of the cover relative to the camera, the cover can be cleaned without blocking the field of view of the camera that is enclosed within the cover.

Also, the camera does not need to be pulled back in which case the camera would be temporarily not useable. Also, the cleaning system can better protect cameras having a sensitive optic, such as fish eye cameras, instead of cleaning/scratching on the fish eye lens with a wiper.

By employing heating means that are in thermal contact with the cover, frost and evaporation can be efficiently avoided. In addition, individual heating elements in the camera body do not need to be used.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIGS. 2a and 2b illustrate a schematic side view and a schematic top view of an example of a cover and a camera.

FIGS. 3a and 3b illustrate a schematic side view and a schematic top view of another example of a cover and a camera.

FIGS. 4 and 5 illustrate schematic cross-sectional views of other examples of covers and cameras.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Here, the term "cover" can be used to refer to a protective enclosure that includes at least one cavity for at least partially enclosing one camera. The term "rotationally move" can be used to refer to a situation where the cover is horizontally, vertically, and/or diagonally moved relative to the camera, or to the lens of the camera, while the camera is kept in an essentially fixed spatial position. The term "at least partially encloses the cover" can be used to refer to a mounting situation where at least parts of the cover are held and located inside the housing. For example, most of the surface of the cover could be located inside the housing. The term "electromagnetic radiation" can be used to refer to radiant energy, such as visible light, etc.

Figure 1A:
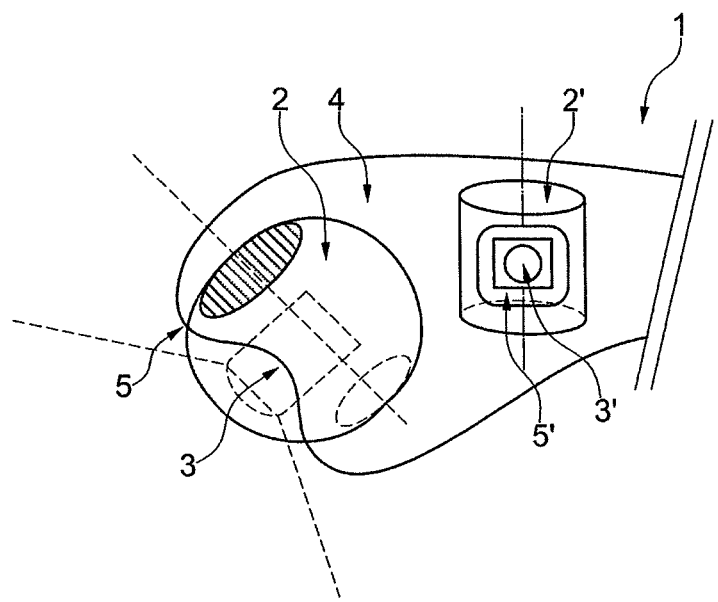
FIGS. 1a and 1b illustrate views of a first and second example of a cleaning system.
Figure 1B:
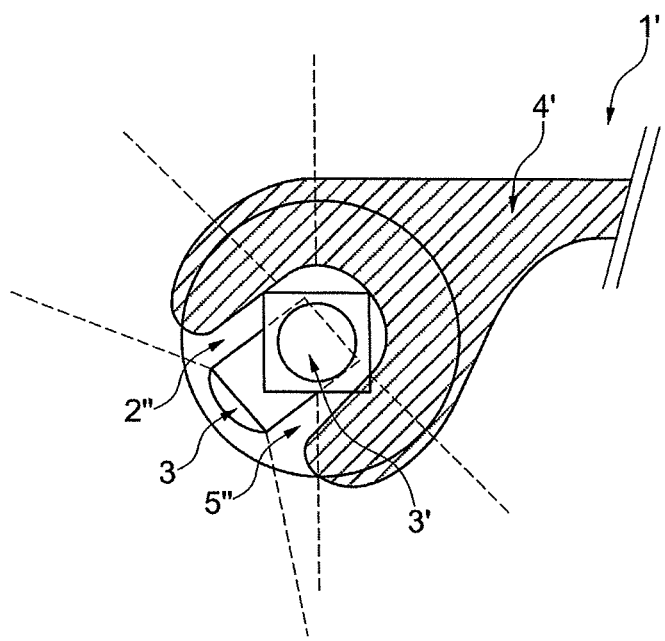

FIGS. 1a and 1b show cleaning systems 1, 1' according to a first and a second example. The cleaning systems 1, 1' include a housing 4, 4', where each housing 4, 4' can be arranged on a vehicle. The skilled person would know that the housings 4, 4' could be, for example, mounted to a side of the vehicle, at a location where traditionally a side view mirror would be mounted. However, the housings 4, 4' could also be mounted on various other locations at the front and/or at the back of the vehicle.

Referring to FIG. 1a, a cover 2 may be enclosed in the housing 4. The cover 2 may be rotationally held in the housing 4 so that it can rotate in the housing 4 about at least one axis that is shown by a dotted line. Drive means such as a motor may be employed for rotating the cover 2. As shown in FIG. 1a, the major part of the cover 2 may be contained within the housing 4. The housing 4 includes an opening 5 so that the part of the cover 2 where the lens of the camera 3 is located behind is exposed to the surroundings of the vehicle. As shown in FIG. 1a, the housing 4 is shaped so that it does not obstruct the viewing angle of the camera 3. In FIG. 1a, an example of the viewing angle of the camera 3 is shown by dotted lines originating from the lens of the camera 3. In this example, the cover 2 could include transparent material so that electromagnetic radiation, for example light, can propagate through the material of the cover 2. The cover 2 encloses a camera 3 that may be substantially aligned with the housing 4. During operation, the camera 3 can take images from the vehicle's surroundings, for example, to present the images to a driver inside the vehicle's cabin, or to supply the image information to a computing device for further processing. For cleaning the view of the camera 3 that might be, for example, impaired by water and/or dirt sticking to the part of the cover 2 that is exposed to the outside, the cover 2 can be rotated around the axis that is shown by the dotted line in regard to the position of the camera 3 and the housing 4. Here, a rotation of just a few degrees in any direction may be sufficient to move the stained area of the cover 2 into the housing 4, and to move an unstained area of the cover 2 that was previously located inside the housing 4 in front of the lens of the camera 3.

FIG. 1a further shows an auxiliary cover 2' installed in the housing 4 that encloses an auxiliary camera 3'. As shown in this example, the housing 4 also includes an auxiliary opening 5' exposing the auxiliary cover 2' to the outside of the vehicle. The auxiliary cover 2' could be operated similar to the cover 2 as described above, where the cover 2' can rotate in the housing 4 around at least one further axis that is shown by a dotted line using the drive means that are described above, or a separate drive means.

In the example that is shown in FIG. 1*a*, the camera 3 could be, for example, a camera having a wide aperture and being encased in a round or elliptical cover 2 for surround-view, while the auxiliary camera 3' could be, for example, a camera 3 having a small aperture and being encased in a round or cylindrical cover 2' for mirror replacement. Also, the skilled person would know that the cameras 3, 3' could include detection means for detecting movement in front of their lenses.

FIG. 1*b* shows a cleaning system 1' according to another example that is similar to the example that is shown in FIG. 1*a*. However, in this example, two cameras 3, 3' are enclosed in one single cover 2". The cameras 3, 3' could be essentially orientated at the same angle of the cameras 3, 3' in the example that is shown in FIG. 1*a*, and could also serve the same purpose. In FIG. 1*b* it is shown that one single opening 5" is shaped so that it does not obstruct the viewing angle of either of the two camera 3, 3'. The cover 2" can be rotated around two axes that are shown by dotted lines in regard to the position of the cameras 3, 3' and the housing 4'.

FIGS. 2*a*, 2*b*, 3*a*, 3*b*, 4 and 5 show schematic views of covers 2, 2', 2", 2''' and cameras 3, 3', 3", 3''' according to various examples. The covers 2, 2', 2", 2''' and the respective cameras 3, 3', 3", 3''' could be similar to the cover 2 and the camera 3 that are shown in FIG. 1*a*. Referring to FIGS. 2*a*, 2*b*, 3*a*, 3*b*, 4 and 5, the covers 2, 2', 2", 2''' are adapted to enclose their respective cameras 3, 3', 3", 3'''. As described in the description accompanying FIGS. 1*a* and 1*b*, the covers 2, 2', 2", 2''' could include transparent material so that electromagnetic radiation, such as light, can propagate through the covers 2, 2', 2", 2''' to the cameras 3, 3', 3", 3''' or to their respective lenses. The skilled person would know that the covers 2, 2', 2", 2''' could include transparent material that is scratch free to withstand abrasion and mechanical impacts from the outside. In these examples, the shape of the covers 2, 2', 2", 2''' are essentially symmetrical with rotation and can be chosen depending on the field of sight of the enclosed cameras 3, 3', 3", 3'''.

In FIGS. 2*a* and 2*b* a schematic side view and a schematic top view of a cover 2 and a camera 3 according to an example are shown. The cover 2 is essentially round or elliptical and includes two opposite flat sections for rotating the cover 2 around a rotational axis (shown by a dotted vertical line). For example, this arrangement could be chosen for enclosing a so-called "Fish-Eye" camera having a wide aperture. The vertical and the horizontal field of views of the camera 3 are shown by dotted lines in FIGS. 2*a* and 2*b*. As already described above, the camera 3 may be kept stationary or may be fixed, while the cover 2 is rotated around the camera 3.

In FIGS. 3*a*, 3*b* a schematic side view and a schematic top view of a cover 2' and a camera 3' according to another example are shown. In the shown example, the cover 2' is essentially cylindrically, i.e. comprising a shape that is essentially convex or concave and could be chosen for enclosing a camera 3' having a small aperture, such as for example a camera 3' for mirror replacement. The vertical and the horizontal field of views of the camera 3' are shown by dotted lines in FIGS. 3*a* and 3*b*.

In FIGS. 4 and 5 schematic cross-sectional views of covers 2", 2''' and cameras 3", 3''' according to further examples are shown. In FIG. 4, the camera 3" can be enclosed off-center in a donut like shaped cover 2" having an essentially round cross section, where the cover 2" can be rotated around an axis of rotation (shown by a dotted vertical line), while the camera 3" is kept at a fixed position inside the cover 2". In FIG. 5, it is shown that the cover 2''' can also have an essentially rectangular cross-section.

Figure 6A:
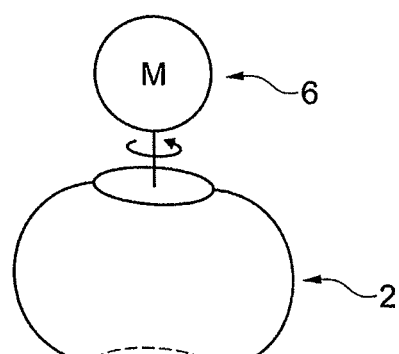
FIGS. 6a and 6b illustrate schematic views of examples of covers and drive means.
Figure 6B:
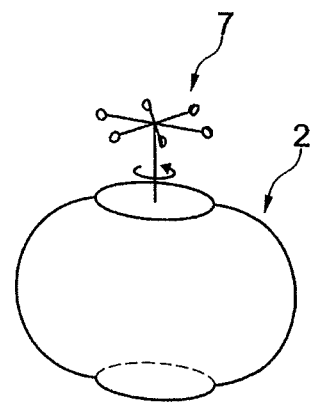

In FIGS. 6*a*, 6*b* schematic views of a cover 2 and drive means according to examples are shown. For rotating the cover 2 relative to a camera (not shown in FIGS. 6*a*, 6*b*), the cleaning system may include drive means that could be, for example, located in the housing. In FIG. 6*a* it is shown that the drive means could include a motor 6, for example an electric motor, to rotate the cover 2. The skilled person would know that a shaft of the motor 6 could interact directly with the cover 2, or could interact with the cover 2 via a transmission. FIG. 6*b* shows that the drive means could also include a turbine 7, for example a windmill, that rotates the cover 2 by means of an air stream, for example by an air stream that occurs when the vehicle is driven. However, the skilled person would know that the drive means could also include a motor 6 and a windmill 7.

Figure 7A:
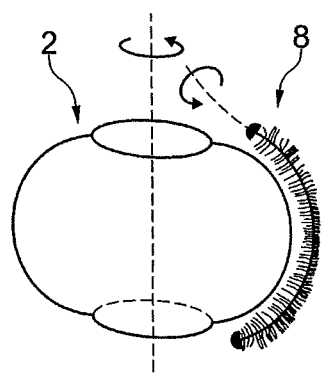
FIGS. 7a and 7b illustrate schematic views of examples of covers and brushes.
Figure 7B:
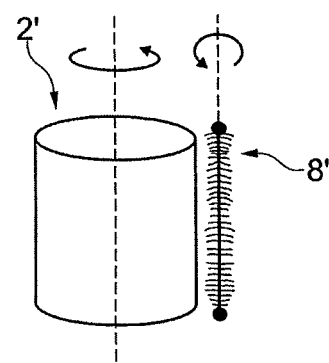

In FIGS. 7*a* and 7*b* schematic views of covers 2, 2' and brushes 8, 8' are shown. During operation, the brushes 8, 8' could be located in the housing so that they are not visible from the outside of the housing, and do not obstruct the field of view of a camera that might be installed in the covers 2, 2'. In the example that is shown in FIG. 7*a*, the brush 8 is installed essentially perpendicularly to the cover 2 and comprises a curvature that follows the curvature of the cover 2. The brush 8 might be also kept rotationally so that it can rotate in the opposite direction of the cover 2 when the cover 2 is rotated around the axis of ration that is shown by a dotted vertical line. In FIG. 7*b* an example is shown where the brush 8' is kept essentially parallel to an essentially cylindrical cover 2'. Also, the brush 8' that is shown in FIG. 7*b* could be kept rotational relative to the cover 2. The skilled person would, however, know that more than just one brush 8, 8' could be used for cleaning the respective covers 2, 2'. Also, the brushes 8, 8' could be arranged essentially diagonally relative to the respective covers 2, 2'.

Figure 8A:
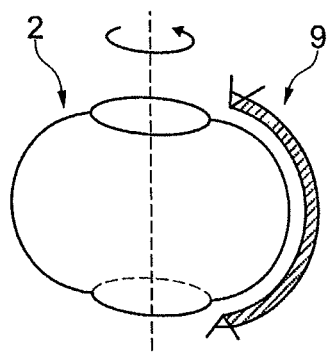
FIGS. 8a and 8b illustrate schematic views of examples of covers and lips.
Figure 8B:
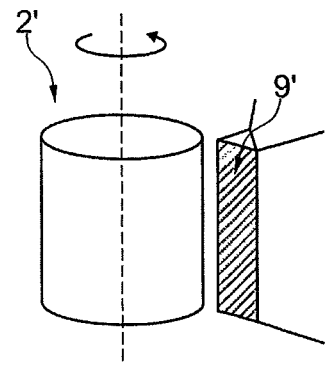

In FIGS. 8*a* and 8*b* schematic views of covers 2, 2' and lips 9, 9' according to examples are shown. In the example that is shown in FIG. 8*a*, the lip 9 may include a curvature that follows the curvature of the cover 2 it is used with. In another example, a straight lip 9 could be also bent so that it follows the curvature of the cover 2. The lip 9 could essentially include a thin strip of rubber material that is suitable to remove liquid from the outer surface of the cover 2, when the cover 2 is rotated relative to the lip 9 around its rotational axis as shown in FIG. 8*a* by a vertical dotted line. Similar to the examples that are described with respect to FIGS. 7*a* and 7*b*, the lip could be located inside the housing, so that it is not visible from the outside and does not obstruct the field of view of a camera that might be installed in the cover 2. When not used for cleaning, the lip could be kept at a location slightly spaced from the cover 2 and pushed onto the cover 2 by appropriate means when cleaning of the cover 2 is desired. In FIG. 8*b* an example is shown where the lip 9' is kept essentially parallel to an essentially cylindrical cover 2'. Also, the skilled person would know that more than just one lip 9, 9' could be used for cleaning the respective covers 2, 2'. Also, the lips 9, 9' could be arranged essentially diagonally relative to the covers 2, 2'.

Also, the skilled person would know that the examples which are shown in FIGS. 7*a*, 7*b*, 8*a*, and 8*b* and described above could be operated in conjunction with at least one nozzle, where the nozzle could be adapted to spray a cleaning fluid, preferably water, onto the outer surface of the covers 2, 2'. In particular, the nozzle could be adapted to spray a cleaning fluid between the outer surface of the covers 2, 2' and the brushes 8, 8', and/or lips 9, 9'.

Figure 9:
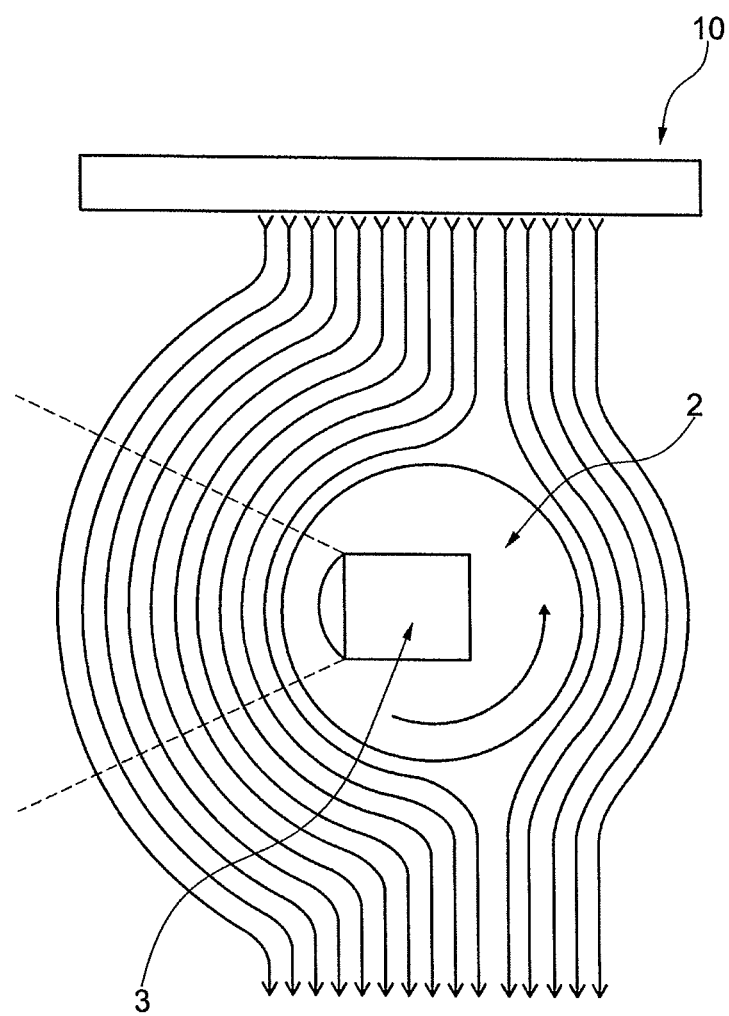
FIG. 9 illustrates a schematic view of an example of a camera enclosed in a cover and a fan.

In FIG. 9 a schematic view of a camera 3 enclosed in a cover 2 and a fan 10 according to another example is shown. As it can be seen in FIG. 9, the fan 10 could be located at a distance to the cover 2 for circulating air around the cover 2, when in operation. The skilled person would know that the fan 10 could be located at some place in, or at the housing. In another example, the fan 10 could be also located externally to the housing. The air stream that is generated by the fan 10 can create an air cushion on the cover 3, in particular in the field of view of the lens installed in the camera 3 to prevent spoiling of the cover 3. The skilled person would know that the fan 10 could include a turbine for generating the air stream artificially, or could alternatively include means for directing the air stream to the cover 3 that occurs when the vehicle is driving.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGNS 1, 1' cleaning system
2, 2', 2", 2''' cover
3, 3', 3", 3''' camera
4, 4' housing
5, 5', 5" opening
6 motor
7 turbine
8, 8' brush
9, 9' lip
10 fan

What is claimed is:

1. A cleaning system for a camera lens, comprising:
a cover adapted to at least partially enclose a camera having at least one camera lens;
a drive means adapted to rotationally move the cover relative to the camera;
an auxiliary cover to at least partially enclose an auxiliary camera having at least one auxiliary camera lens;
an auxiliary drive means adapted to rotationally move the auxiliary cover relative to the auxiliary camera;
a housing adapted to hold the cover, the auxiliary cover, the drive means, and the auxiliary drive means,
wherein the camera has a wide aperture for surround view, and the housing at least partially encloses the cover and comprises an opening for allowing electromagnetic radiation to pass through the cover to the at least one camera lens, and wherein the auxiliary camera has a narrow aperture for mirror replacement, and the housing at least partially encloses the auxiliary cover and comprises an auxiliary opening for allowing light to pass through the auxiliary cover to the at least one auxiliary camera lens.

2. The cleaning system of claim 1, wherein the cover comprises at least one of a substantially transparent material and a substantially scratch-proof material.

3. The cleaning system of claim 1, wherein the cover fully encloses the camera or the cover encloses at least the at least one camera lens.

4. The cleaning system of claim 1, wherein the cover is substantially radially symmetric.

5. The cleaning system of claim 1, wherein the cover comprises at least one of a rectangular, cylindrical, spherical, conical, elliptical, and circular shape, at least a part of the cover comprises a convex or concave shape, and the part of the cover comprising the convex or concave shape is adapted to be moved over at least one of the camera and the at least one camera lens.

6. The cleaning system of claim 1, wherein the drive means comprises at least one of a motor, an electric motor, and a windmill, to rotationally move the cover relative to the camera using an air stream.

7. The cleaning system of claim 1, further comprising at least one cleaning device, wherein the cleaning device is adapted to clean an outer surface of the cover, and the cleaning device is installed essentially perpendicularly to the cover and comprises a curvature that follows the curvature of the cover or extends essentially along a straight line.

8. The cleaning system of claim 7, wherein the cleaning device comprises at least one brush for cleaning the outer surface of the cover, and the brush is kept rotationally relative to the cover.

9. The cleaning system of claim 7, wherein the cleaning device comprises at least one lip for cleaning the outer surface of the cover and the lip comprises PVC material.

10. The cleaning system of claim 7, comprising at least one nozzle, wherein the nozzle is adapted to spray a cleaning fluid onto the outer surface of the cover and the nozzle is adapted to spray the cleaning fluid between the outer surface of the cover and the cleaning device.

11. The cleaning system of claim 1, further comprising at least one fan for circulating air around the cover.

12. The cleaning system of claim 1, further comprising at least one heating means in thermal contact with the cover, wherein the heating means comprises at least one heating coil.

13. The cleaning system of claim 1, wherein the cover is adapted to at least partially enclose at least one auxiliary camera having at least one auxiliary camera lens.

14. A rear view display device for a vehicle comprising at least one cleaning system according to claim 1.

15. A vehicle, comprising at least one rear view display device according to claim 14.

16. The cleaning system of claim 1, further comprising one or more wiping element that engage opposite regions of the cover at or near opposite sides of the at least one opening.

17. The cleaning system of claim 16, wherein the cover is rotatable in opposite directions, and wherein, in response to the cover rotating in one direction, one of the one or more wiping elements cleans a portion of the transparent cover element that was in front of the at least one camera lens, and wherein, in response to the cover rotating in the other direction, another of the one or more wiping elements cleans a portion of the cover that was in front of the at least one camera lens.

18. The cleaning system of claim 1, wherein the cover is rotatable at least 45 degrees in at least one direction.

19. The cleaning system of claim 1, wherein the cover is rotatable at least 45 degrees relative to the camera.

20. The cleaning system of claim 16, wherein the cover comprises a generally cylindrical element that is fully rotated about a longitudinal axis to clean an entirety of the cover with the one or more wiping elements.

21. The cleaning system of claim 1, wherein the cleaning system is part of a multi-camera vision system of the vehicle.

22. The cleaning system of claim 21, wherein the camera module of the multicamera vision system captures image data for display of a surround view of the vehicle for viewing by a driver of the vehicle.

23. The cleaning system of claim 1, wherein the drive means is adapted to rotate the cover around a first axis, and the auxiliary drive means is adapted to rotate the auxiliary cover around a second axis, the first axis being different than the second axis.

\* \* \* \* \*